United States Patent
Gupta et al.

(10) Patent No.: US 11,039,360 B2
(45) Date of Patent: Jun. 15, 2021

(54) ELECTRONIC DEVICE FOR SELECTING NETWORK

(71) Applicant: SAMSUNG ELECTRONICS CO., LTD., Suwon-si (KR)

(72) Inventors: Ashish Gupta, Suwon-si (KR); Manbir Singh Soni, Punjab (IN); Parveen Dudani, Westbengal (IN); Gi Beom Kim, Seongnam-si (KR); Yong Hae Choi, Hwaseong-si (KR); Raj Kumar Saranapp, Karnataka (IN); Prashanta C Mutnal, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/470,842

(22) PCT Filed: Dec. 6, 2017

(86) PCT No.: PCT/KR2017/014257
§ 371 (c)(1),
(2) Date: Jun. 18, 2019

(87) PCT Pub. No.: WO2018/117491
PCT Pub. Date: Jun. 28, 2018

(65) Prior Publication Data
US 2019/0313312 A1    Oct. 10, 2019

(30) Foreign Application Priority Data

Dec. 19, 2016 (KR) .................... 10-2016-0173605

(51) Int. Cl.
*H04W 36/14* (2009.01)
*H04W 24/08* (2009.01)
(Continued)

(52) U.S. Cl.
CPC .......... *H04W 36/14* (2013.01); *H04W 24/08* (2013.01); *H04W 36/30* (2013.01); *H04W 48/18* (2013.01); *H04W 88/06* (2013.01)

(58) Field of Classification Search
CPC ..... H04W 36/14; H04W 48/18; H04W 24/08; H04W 36/30; H04W 88/06; H04W 36/0085; H04W 36/26
See application file for complete search history.

(56) References Cited

U.S. PATENT DOCUMENTS 7,653,392 B2  1/2010 Ovadia et al.
7,936,708 B2  5/2011 Kesavan et al.
(Continued)

FOREIGN PATENT DOCUMENTS

KR  10-2016-0101440   8/2016
WO  2015-133819       9/2015

OTHER PUBLICATIONS

International Search Report for PCT/KR2017/014257, dated Mar. 15, 2018, 4 pages.
(Continued)

*Primary Examiner* — Thai Nguyen
(74) *Attorney, Agent, or Firm* — Nixon & Vanderhye, P.C.

(57) ABSTRACT

An electronic device includes a communication circuitry, a processor electrically connected with the communication circuitry, a memory electrically connected with the processor. The memory stores instructions, when executed, causing the processor to connect the electronic device and a first network using the communication circuitry, determine a first user context among user contexts which are data associated with an operation state of the electronic device, and maintain a connection with the first network based on whether communication quality of the first network meets first communication quality corresponding to the determined first user
(Continued)

context or switch from the first network to a second network different from the first network. Various other embodiments recognized from the specification are also possible.

14 Claims, 14 Drawing Sheets

(51) Int. Cl.
*H04W 36/30* (2009.01)
*H04W 48/18* (2009.01)
*H04W 88/06* (2009.01)

(56) References Cited

U.S. PATENT DOCUMENTS

| | | |
|---|---|---|
| 8,385,200 B2 | 2/2013 | Rainer et al. |
| 9,185,719 B2 | 11/2015 | Wietfeldt et al. |
| 9,210,627 B1 | 12/2015 | Rao et al. |
| 9,479,982 B2 | 10/2016 | Rao et al. |
| 9,538,474 B2 | 1/2017 | Ganesh et al. |
| 2007/0253339 A1 | 11/2007 | Ovadia et al. |
| 2009/0215404 A1 | 8/2009 | Kesavan et al. |
| 2010/0110890 A1 | 5/2010 | Rainer et al. |
| 2011/0199989 A1 | 8/2011 | Wietfeldt et al. |
| 2011/0201304 A1* | 8/2011 | Sutaria .................. H04M 15/44 455/408 |
| 2015/0163811 A1* | 6/2015 | Konstantinou ....... H04W 76/16 370/329 |
| 2015/0230179 A1* | 8/2015 | Gupta .................. H04W 28/04 370/311 |
| 2015/0350972 A1 | 12/2015 | Rao et al. |
| 2016/0057667 A1 | 2/2016 | Rao et al. |
| 2016/0081027 A1 | 3/2016 | Ganesh et al. |
| 2016/0239194 A1 | 8/2016 | Hajj et al. |
| 2016/0242183 A1 | 8/2016 | Kang et al. |
| 2017/0019939 A1 | 1/2017 | Shin et al. |
| 2017/0026820 A1 | 1/2017 | Han et al. |

OTHER PUBLICATIONS

Written Opinion of the ISA for PCT/KR2017/014257, dated Mar. 15, 2018, 5 pages.

\* cited by examiner

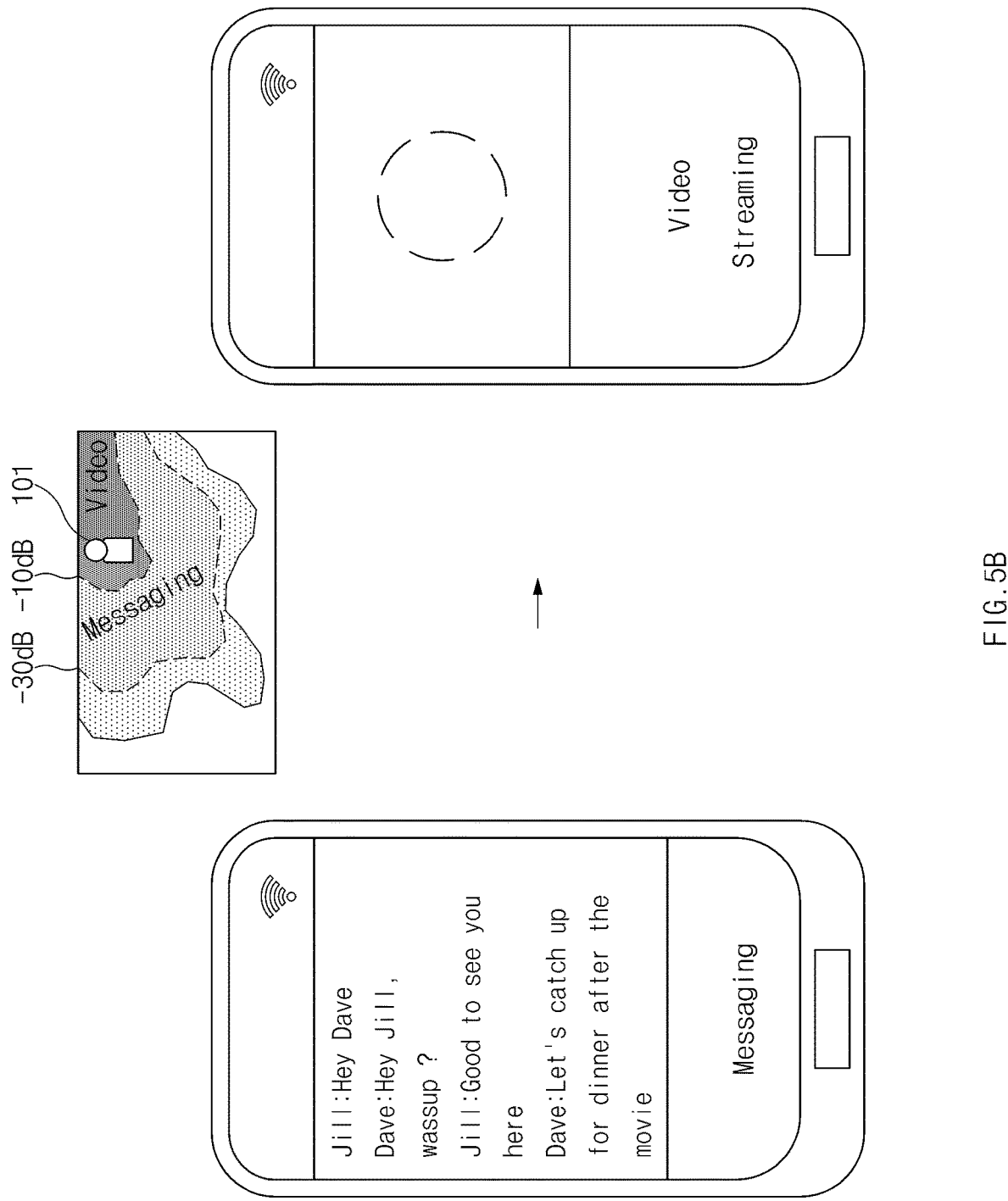

ELECTRONIC DEVICE FOR SELECTING NETWORK

This application is the U.S. national phase of International Application No. PCT/KR2017/014257 filed 6 Dec. 2017, which designated the U.S. and claims priority to KR 10-2016-0173605 filed 19 Dec. 2016, the entire contents of each of which are hereby incorporated by reference.

TECHNICAL FIELD

The disclosure relates to technologies for selecting a network.

BACKGROUND ART

With the development of mobile communication technology, electronic devices, each of which has an antenna, for example, smartphones and wearable devices, have come into wide use. Such an electronic device may be connected with a Wi-Fi network, an LTE network, or the like via the antenna to transmit and receive messages, photos, videos, music files, games, or the like.

Respective networks available to the electronic device may have different features. For example, the LTE network provided to limited subscriber ensures high security and stable communication environments instead of paying fees for use thereof. On the other hand, the Wi-Fi network available for free provides relatively low security and variable communication environments.

Because there are advantages and disadvantages in respective networks available to an electronic device, the electronic device needs to select the network depending on a situation of its user. For example, to prevent fees from occurring when the user receives a large file, the electronic device needs to be connected with a Wi-Fi network. Unlike the above-mentioned example, to provide a stable communication environment to the user when the user plays a video, the electronic device needs to be connected with an LTE network.

However, because the electronic device is unable to determine a situation of the user and select a network suitable for the situation of the user, the user directly should select a network to be connected with the electronic device. Because the user directly should select the network to be connected with the electronic device depending to the situation, he or she feels uncomfortable.

SUMMARY

Various embodiments disclosed in the disclosure are to provide an electronic device for addressing the above-mentioned problems and issues raised in the disclosure.

In accordance with an aspect of the disclosure, an electronic device is provided. The electronic device may include a communication circuitry, a processor electrically connected with the communication circuitry, and a memory electrically connected with the processor. The memory may store instructions, when executed, causing the processor to connect the electronic device and a first network using the communication circuitry, determine a first user context among user contexts which are data associated with an operation state of the electronic device, and maintain a connection with the first network or switch from the first network to a second network different from the first network based on whether communication quality of the first network meets first communication quality corresponding to the determined first user context.

In accordance with another aspect of the disclosure, an electronic device is provided. The electronic device may include a communication circuitry, a processor electrically connected with the communication circuitry, and a memory electrically connected with the processor. The memory may store instructions, when executed, causing the processor to connect the electronic device and a first network using the communication circuitry, determine whether there is a second network connectable with the electronic device, determine a first user context among user contexts which are data associated with an operation state of the electronic device, when there is the second network connectable with the electronic device as a result of the determination, and maintain the first network or switch to the second network, based on whether communication quality of the second network meets first communication quality corresponding to the determined first user context.

According to embodiments disclosed in the disclosure, convenience may be provided to a user by automatically connecting an electronic device and a network based on user preference.

In addition, various effects directly or indirectly ascertained through the disclosure may be provided.

BRIEF DESCRIPTION OF THE DRAWINGS

FIG. 5B illustrates an electronic device for maintaining a network although the user context is changed, according to an embodiment;

DETAILED DESCRIPTION OF EXAMPLE EMBODIMENTS

Figure 1:
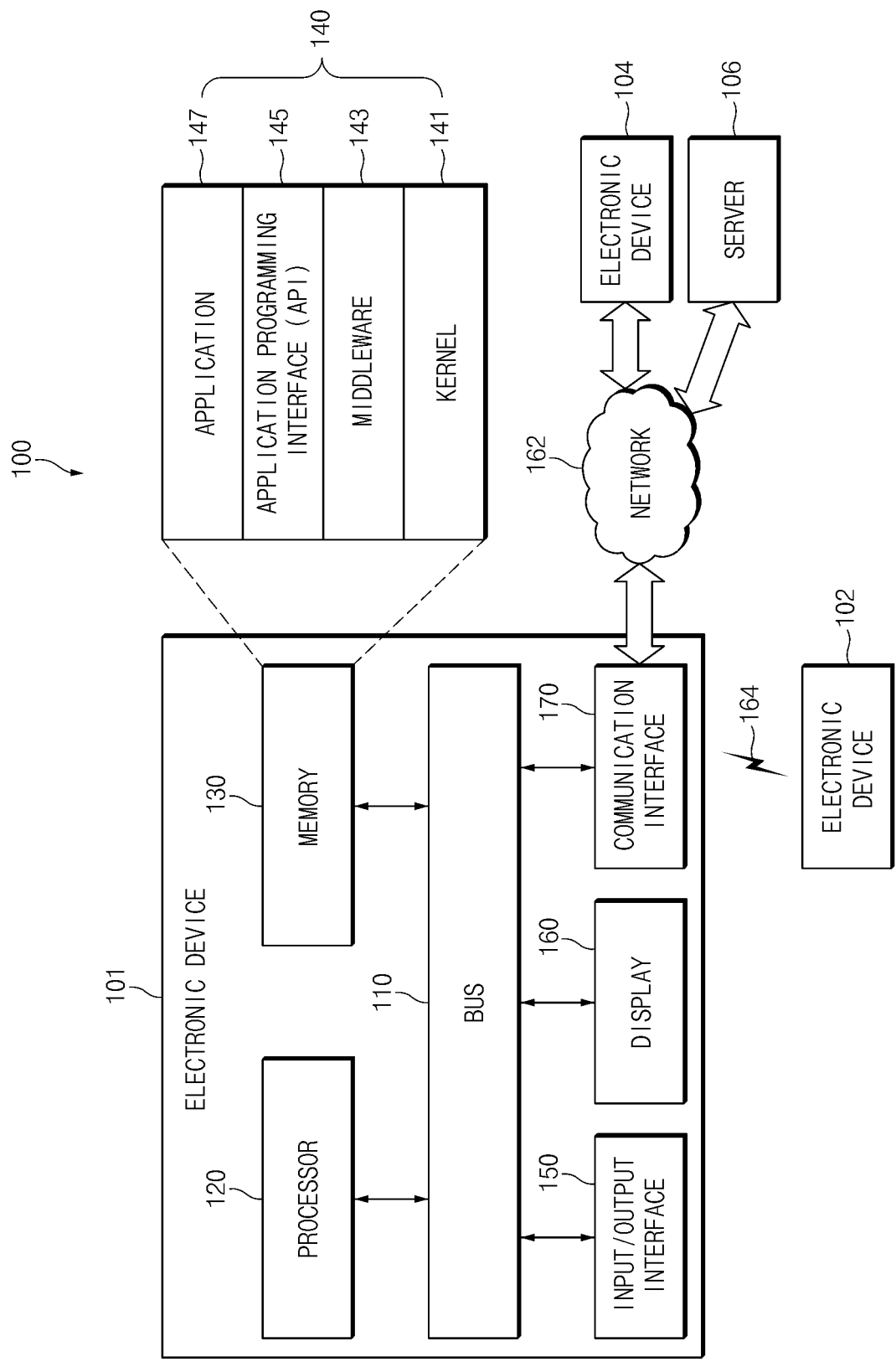
FIG. 1 illustrates an electronic device in a network environment according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
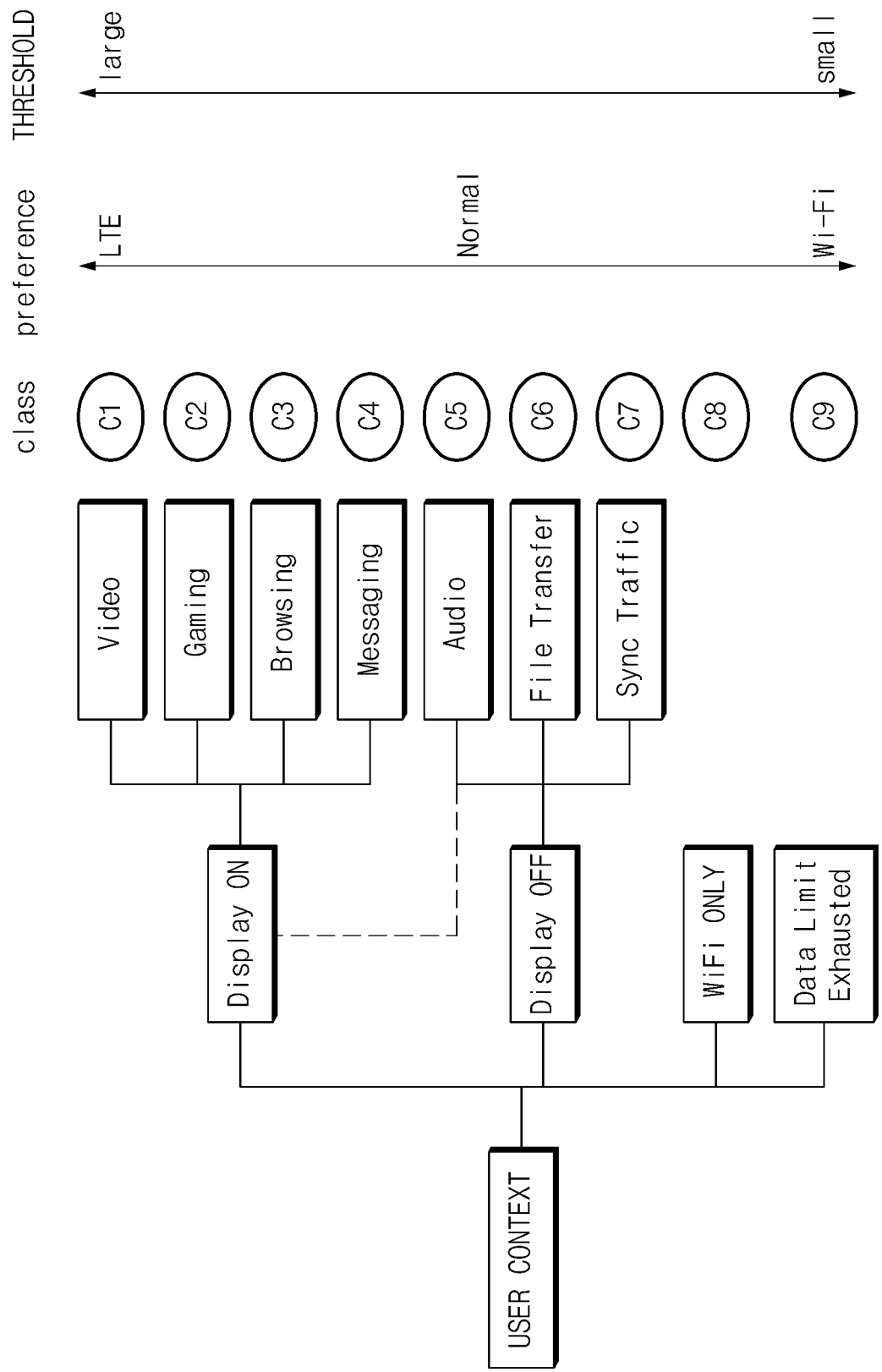
FIG. 2 illustrates a drawing for classifying a user context according to an embodiment.

FIG. 2 illustrates a drawing for classifying a user context according to an embodiment. In the disclosure, details described in FIG. 1 may also be applied to components having the same denotations as those of an electronic device 101 described in FIG. 1.

Referring to FIG. 2, a memory 130 may store a user context and/or at least one application. The user context may be data associated with an operation state of the electronic device 101. For example, the user context may vary with an application executed in the electronic device 101, network preference of a user, or the like. Furthermore, the user context may vary with an ON/OFF state of a display, location information of the electronic device 101, or the like.

As an embodiment, the user context may vary with an ON/OFF state of the display 160. For example, when the display 160 is in an ON state and when the display 160 is in an OFF state, a user context corresponding to each state may vary. As an embodiment, the user context may vary with a location of the electronic device 101. For example, when the electronic device is located in a house of the user and when the electronic device is located in a company of the user, a user context according to each location may vary.

As an embodiment, the electronic device 101 may determine a user context based on the ON/OFF state of the display 160 and/or a type of an application executed in the electronic device 101. For example, when the display 160 is ON and when a message application is executed, the electronic device 101 may determine the user context as a messaging context. When the display 160 is OFF and when an audio application is executed, the electronic device 101 may determine the user context as an audio context.

According to an embodiment of the disclosure, the electronic device 101 may divide the user context into at least one level (hereinafter referred to as "class"). That is, the class may be a grade of dividing the user context depending on a predetermined criterion.

According to an embodiment, the electronic device 101 may divide the user context into at least one class on the basis of network preference. For example, in FIG. 2, as a class number is smaller (e.g., as the class number is closer to C1), there may be a higher probability that the electronic device 101 will be connected with LTE. As the class number is larger (e.g., as the class number is closer to C9), there may be a higher probability that the electronic device 101 will be connected with Wi-Fi. For example, a context corresponding to a situation (data limit exhausted) where all of data usage is exhausted may correspond to C9. In this case, no matter how bad signal quality of LTE data is, the electronic device 101 may perform only a Wi-Fi connection. On the other hand, when a video is played with the display turned ON, the user context may correspond to C1. When a state of Wi-Fi does not reach a significant level, the electronic device 101 may try to preferably keep LTE connected.

According to an embodiment of the disclosure, the electronic device 101 may divide the user context into at least one class on the basis of a threshold. The threshold may be minimum signal strength to connect Wi-Fi and the electronic device 101. As the class number is smaller, because there is a higher probability that the electronic device 101 will be connected with LTE, as the class number is smaller, the threshold may become larger. As the class number is larger, because there is a higher probability that the electronic device 101 will be connected with Wi-Fi, as the class number is larger, the threshold may become smaller. For example, a threshold of a video context may be −10 dB, a threshold of a gaming context may be −20 dB, and a threshold of a browsing context may be −30 dB.

According to an embodiment of the disclosure, the electronic device 101 may determine network preference of the user. For example, the network preference of the user may be determined based on a ratio at which the user receives data over Wi-Fi. The ratio of the data received over Wi-Fi may be the ratio of an amount of the data received over Wi-Fi to a total amount of data received by the electronic device 101. For example, when the total amount of data received by the electronic device 101 is 1 GB, when the amount of data received over Wi-Fi is 0.5 GB, and when an amount of data received over a cellular network (e.g., LTE) is 0.5 GB, the ratio of data received over Wi-Fi may be 50%.

TABLE 1

| User context | | Ratio of data received over Wi-Fi | Preference |
| --- | --- | --- | --- |
| First user (First electronic user) | Browsing | 70% | Normal |
| | Video | 95% | Wi-Fi |
| | Audio | 30% | LTE |
| Second user (Second electronic user) | Browsing | 60% | Normal |
| | Video | 60% | Normal |
| | Audio | 60% | Normal |
| Third user (Third electronic user) | Browsing | 92% | Wi-Fi |
| | Video | 99% | Wi-Fi |
| | Audio | 97% | Wi-Fi |

Table 1 is a table in which user preference is written for each user context based on the ratio of data received over Wi-Fi. Referring to Table 1, when the ratio of the data received over Wi-Fi is greater than a first ratio (e.g., 80%), a network the user prefers may be Wi-Fi. Furthermore, when the ratio of the data received over Wi-Fi is greater than or equal to the first ratio, a class number may become larger. For example, because the ratio of the data received over Wi-Fi is 95% when a first user plays a video using a first electronic device, a video context for the first user may have a class (e.g., C7) lower than a video context of FIG. 2.

According to an embodiment, when the ratio of the data received over Wi-Fi is less than the first ratio and is greater than or equal to a second ratio (e.g., 40% to 60%), the network the user prefers may be set as a network with good communication quality between Wi-Fi or LTE. When a second user searches for materials through browsing, the ratio of the data received over Wi-Fi may be 60%. Thus, the network the second user prefers when searching for the materials may be a network with good communication quality between Wi-Fi or LTE.

According to an embodiment, when the ratio of the data received over Wi-Fi is less than the second ratio, the network the user prefers may be LTE. Furthermore, the ratio of the data received over Wi-Fi is less than the second ratio, the class number may become small. For example, because the ratio of the data received over Wi-Fi is 30% when the first user plays an audio using the first electronic device 101, the audio context for the first user may have a class (e.g., C2) higher than an audio context of FIG. 2.

According to an embodiment, in Table 1, when a third user searches for materials through browsing or plays a video or audio, the ratio of the data received over Wi-Fi may be greater than or equal to the first ratio. Thus, the browsing context, the video context, and/or the audio context for the third user may have a class (e.g., C7) lower than a browsing context, a video context, and/or an audio context of FIG. 2.

Figure 3:
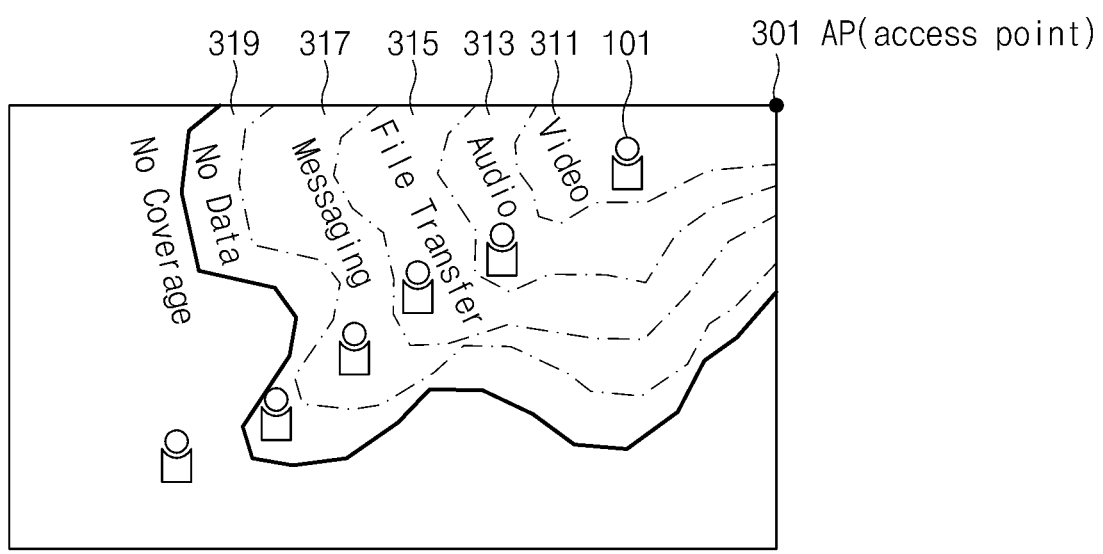
FIG. 3 illustrates coverage of an AP according to an embodiment.

FIG. 3 illustrates coverage of an access point (AP) according to an embodiment.

Referring to FIG. 3, an electronic device 101 may set coverage of an AP 301. For example, when the coverage of the AP 301 is set, information about the coverage may be stored in a memory 130 of the electronic device 101. The coverage may be an area where the electronic device 101 is able to transmit and receive a signal with the AP 301. As an embodiment, the electronic device 101 may set the coverage based on a threshold of a user context. For example, when a threshold of a video context is −10 dB and when a threshold of an audio context is 20 dB, coverage 313 for the audio context may be wider than coverage 311 for the video context. For another example, when a threshold of a file transfer context is −30 dB and when a threshold of a messaging context is −40 dB, coverage 317 for the messaging context may be wider than coverage 315 for the file transfer context.

According to an embodiment of the disclosure, the electronic device 101 may determine an application executable by the electronic device 101 based at least in part on whether the electronic device 101 is located within coverage. For example, when the electronic device 101 is located within the coverage 311, because strength of a signal received at the electronic device 101 is greater than the threshold of the video context, a user may execute a video application using Wi-Fi. Furthermore, because the threshold of the video context is the largest value among thresholds of user contexts shown in FIG. 3, the strength of the signal received at the electronic device 101 may be greater than the thresholds of all the user contexts shown in FIG. 3. Thus, the user may execute an audio application and may execute a message application, using Wi-Fi.

Unlike the above-mentioned example, when the electronic device 101 is out of the coverage 311 concurrently with being within the coverage 313, the strength of the signal received at the electronic device 101 may be greater than the threshold of the audio context and may be less than the threshold of the video context. Thus, when the user executes a video application, the network may change from Wi-Fi to LTE. When the user executes the audio application, the connection with Wi-Fi may be maintained.

Figure 4:
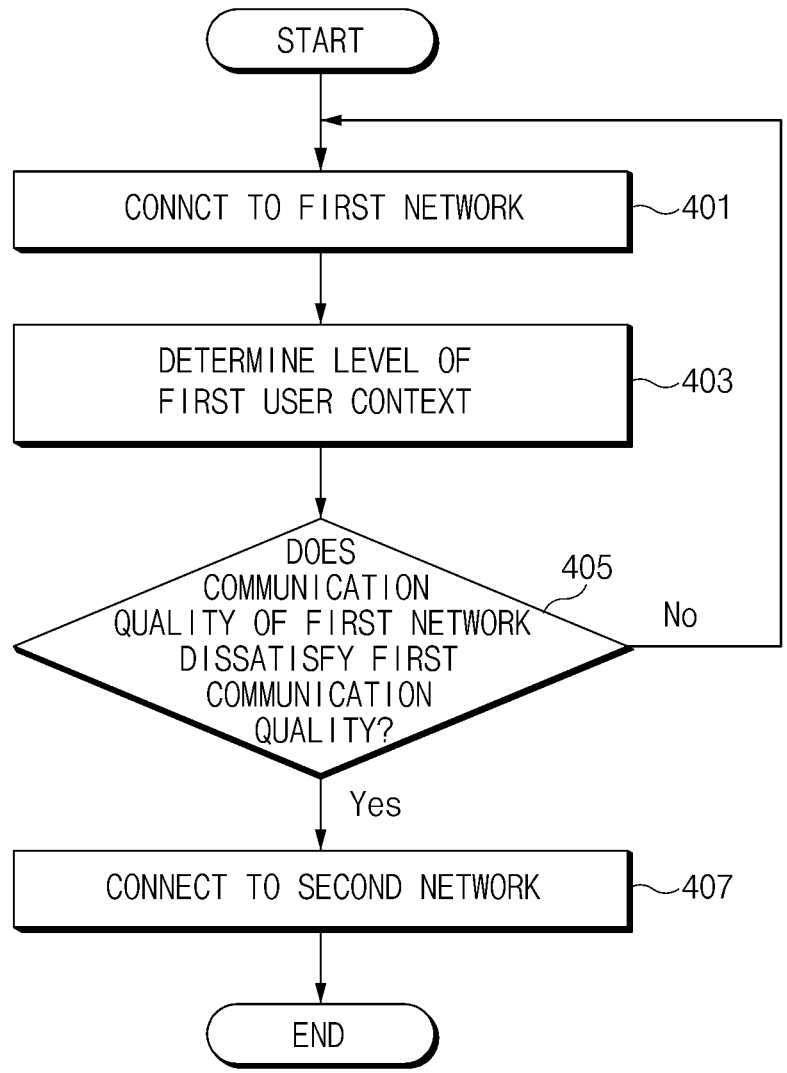
FIG. 4 illustrates an operational flowchart of an electronic device according to an embodiment.

FIG. 4 illustrates an operational flowchart of an electronic device 101 according to an embodiment.

In operation 401 according to an embodiment, the electronic device 101 may be connected with a first network (e.g., Wi-Fi) via a communication circuitry included in the electronic device 101. The communication circuitry may correspond to, for example, a communication interface 170 shown in FIG. 1. For another example, the electronic device 101 may include at least one communication circuitry.

In operation 403 according to an embodiment, the electronic device 101 may perform an operation of determining a first user context. The first user context may be data associated with an operation state of the electronic device 101. For example, when a user plays a video by means of the electronic device 101, the electronic device 101 may determine the first user context as a video context. For another example, in operation 403, the electronic device 101 may determine a level of the first user context. In the above-mentioned example, because the first user context is the video context, the electronic device 101 may determine the level of the first user context as C1.

In operation 405 according to an embodiment, the electronic device 101 may determine whether communication quality of the first network satisfies first communication quality. For example, the communication quality of the first network may be strength of a signal received over Wi-Fi, and the first communication quality may be a threshold of the first user context. That is, the electronic device 101 may compare communication quality of a Wi-Fi network with the threshold of the first user context. When the communication quality of the Wi-Fi network is greater than or equal to the threshold of the first user context as a result of the comparison, the electronic device 101 may maintain the connection between the electronic device 101 and the Wi-Fi network. For example, when a threshold of the video context is −10 dB and when the communication quality of the Wi-Fi network is −5 dB, the electronic device 101 may maintain the connection between the electronic device 101 and the Wi-Fi network.

In operation 407 according to an embodiment, when the communication quality of the Wi-Fi network is less than the threshold of the first user context, the electronic device 101 may be connected with a second network (e.g., LTE). In the above-mentioned example, when the communication quality of the Wi-Fi network is −15 dB, the electronic device 101 may change a network to be connected with the electronic device 101 from Wi-Fi to LTE. According to an embodiment of the disclosure, convenience may be provided to the user by connecting a network the user prefers and the electronic device 101.

In an embodiment, the communication quality may vary with link quality and network quality. For example, when link quality between the electronic device 101 and an AP is less than a threshold, real quality of the Wi-Fi network may be identified through the AP. As a result of the identification, whether to switch to LTE may be determined. That is, when network quality between the AP and a network connected with the AP is less than a threshold, the electronic device 101 may change from the Wi-Fi network to an LTE network. When the network quality is greater than or equal to the threshold, the electronic device 101 may maintain Wi-Fi. A description will be given below of an embodiment associated with this with reference to FIGS. 8 and 9.

Figure 5A:
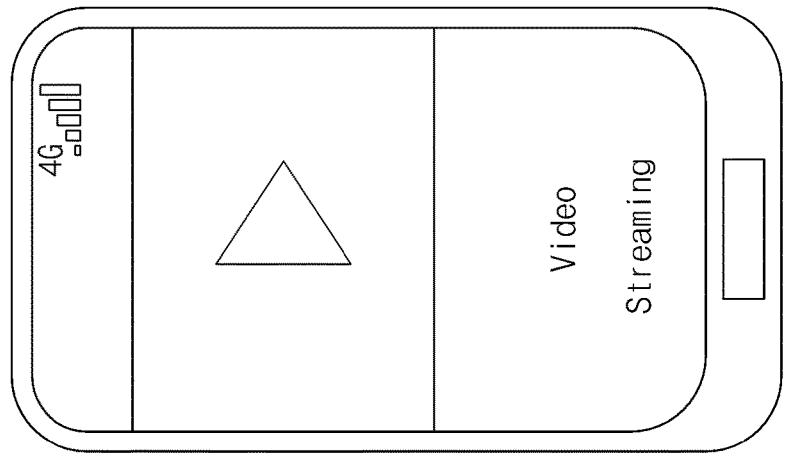
FIG. 5A illustrates an electronic device for changing a network based on a changed user context when the user context is changed, according to an embodiment.
Figure 5A:
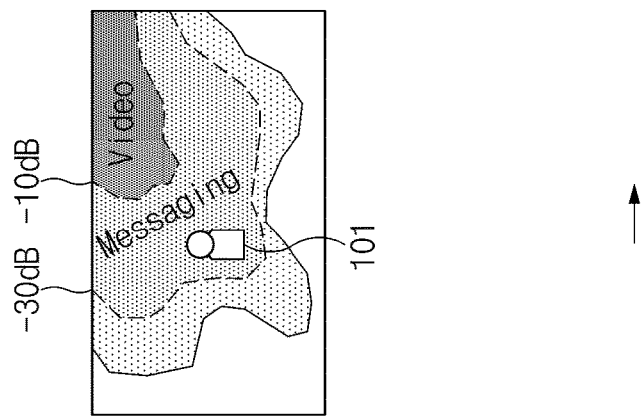
Figure 5A:
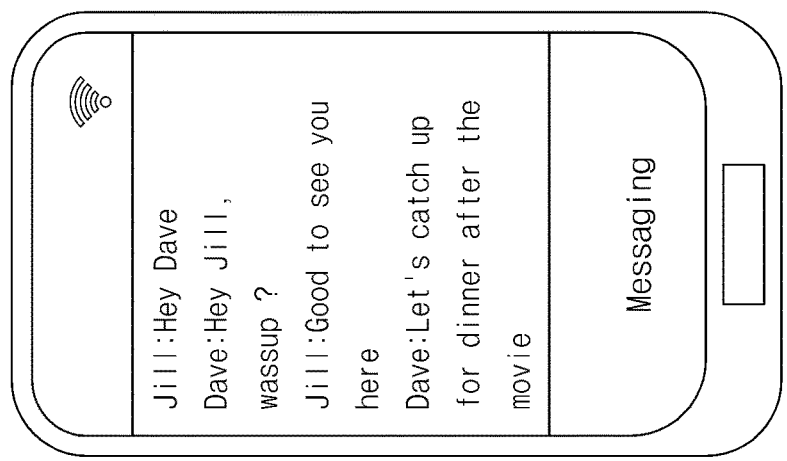

FIG. 5A illustrates an electronic device for changing a network based on a changed user context when the user context is changed, according to an embodiment. FIG. 5B illustrates an electronic device for maintaining a network although the user context is changed, according to an embodiment. An embodiment shown in FIGS. 5A and 5B may be an example of a flowchart shown in FIG. 4.

Referring to FIGS. 5A and 5B, when a user context is changed, an electronic device 101 may maintain a first network or may change to a second network. Whether the user context is changed may be determined based on an operation state of the electronic device 101, whether an application is executed, an on/off state of a display, or the like. For example, when communication quality of the first network is greater than or equal to a threshold of a changed user context, the electronic device 101 may maintain the first network. According to another embodiment, when the communication quality of the first network is less than the threshold of the changed user context, the electronic device 101 may change the network from the first network to the second network.

Referring to FIG. 5A, when the user context is changed, the electronic device 101 may compare the communication quality of the first network with the threshold of the changed user context. When the communication quality of the first network is less than the threshold of the changed user context as a result of the comparison, the electronic device 101 may change a network connected via its communication circuitry. For example, in FIG. 5A, a threshold of a messaging context may be −30 dB, communication quality of the first network (e.g., Wi-Fi) may be −20 dB, and a threshold of a video context may be −10 dB. When the user context is changed from the messaging context to the video context, because the communication quality of the first network is less than the threshold of the video context, the electronic device 101 may be connected with the second network (e.g., LTE).

Referring to FIG. 5B, although the user context is changed, the electronic device 101 may maintain a network connected with the electronic device 101. As an embodiment, when the user context is changed, the electronic device 101 may compare communication quality of the first network (e.g., Wi-Fi) with a threshold of the changed user context. When the communication quality of the first network is greater than or equal to the threshold as a result of the comparison, the electronic device 101 may maintain the connection between the electronic device 101 and the first network. For example, in FIG. 5B, the threshold of the messaging context may be −30 dB, the communication quality of the first network may be −5 dB, and the threshold of the video context may be −10 dB. Furthermore, the user context may be changed from the messaging context to the video context. Although the user context is changed from the messaging context to the video context, because the communication quality of the first network is greater than the threshold of the video context, the electronic device 101 may maintain the connection between the electronic device 101 and the Wi-Fi network.

Figure 6:
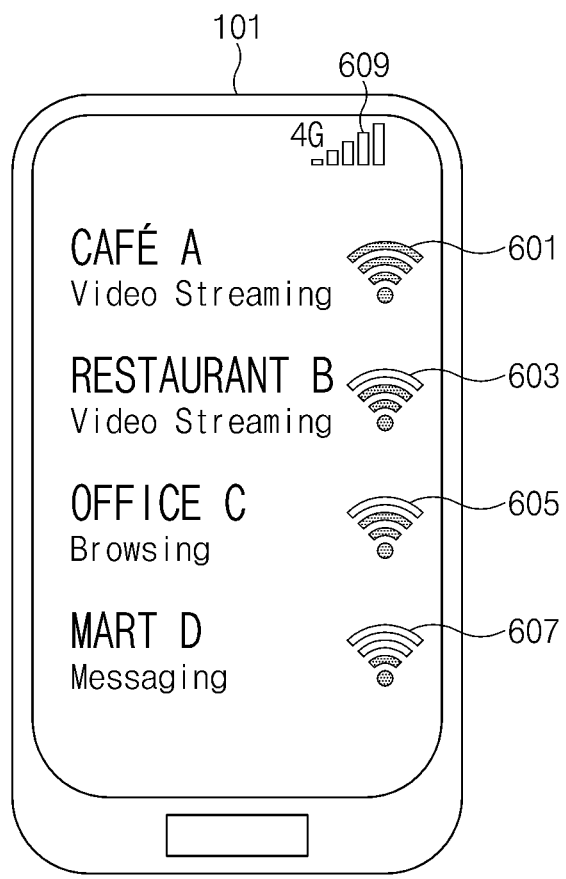
FIG. 6 illustrates networks connectable to an electronic device and user contexts corresponding to the respective networks according to an embodiment.

FIG. 6 illustrates networks connectable to an electronic device and user contexts corresponding to the respective networks according to an embodiment.

Referring to FIG. 6, an electronic device 101 may be connected with at least one AP via its communication circuitry to use a Wi-Fi network. For example, the electronic device 101 may be connected with the Wi-Fi network via an AP of café A, an AP of restaurant B, an AP of office C, or an AP of mart D.

Each AP may provide different signal quality. For example, the electronic device 101 may be configured to display signal quality 601, 603, 605, and 607 of the respective APs together on a display of the electronic device 101 when connected to the respective APs. All of signal strength of four Wi-Fi APs is displayed in the example of FIG. 6, but it is illustrative. The electronic device 101 may output at least one Wi-Fi AP recognizable in the corresponding location and signal strength thereof on the display 160. For example, when a user is located in café A and when restaurant B, office C, and mart D are located near café A, the electronic device 101 may detect signals transmitted from APs of café A, restaurant B, office C, and mart D. When the signals transmitted from APs of café A, restaurant B, office C, and mart D are detected, the electronic device 101 may output strength of each signal on the display 160.

According to an embodiment of the disclosure, the electronic device 101 may set a context suitable for an AP based on user behavior. For example, when the user mainly use a video streaming service in café A with a relatively good signal state, the electronic device 101 may determine that the AP of café A is suitable for video streaming. In this example, when the user views a video in café A, the electronic device 101 may maintain the Wi-Fi connection in link quality of a first level. However, when the user views the video in a state where it is connected with another AP, for example, the AP of office C, the electronic device 101 may attempt to switch to an LTE network depending on signal quality (although link quality of the same first level is even obtained).

In an additional embodiment, the networks 601, 603, 605, and 607 connectable with the electronic device 101 and user contexts suitable for the networks 601, 603, 605, and 607 may be matched to be output on the display 160. For example, because strength of a signal transmitted from the AP of café A is strong, the electronic device 101 may output the network 601 of café A and a video context on the display 160. Furthermore, because strength of a signal transmitted from the AP of mart D is weak, the electronic device 101 may display the network 607 of mart D and a messaging context on the display 160.

Figure 8:
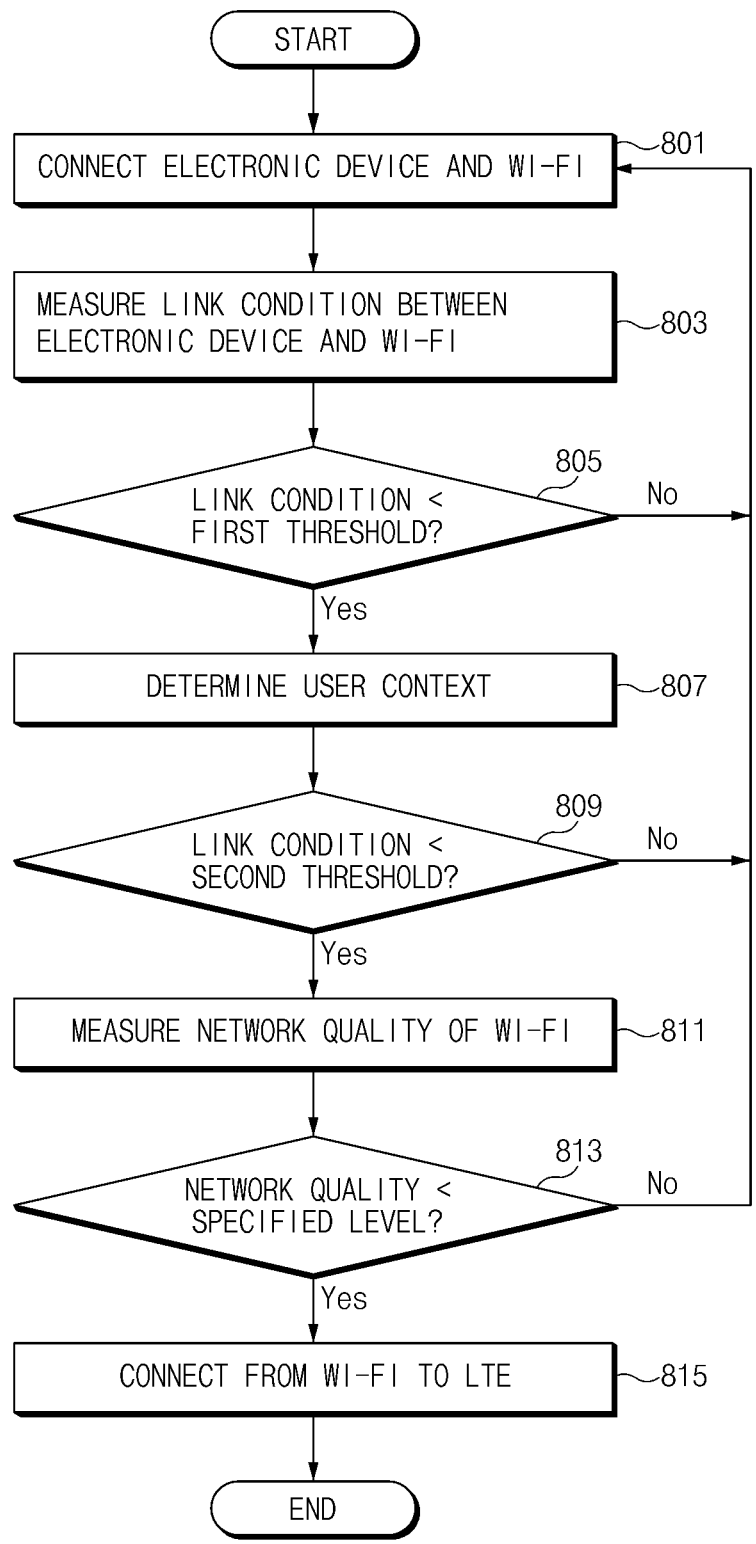
FIG. 8 illustrates an operational flowchart of an electronic device for changing a network from Wi-Fi to LTE according to an embodiment.

When the networks 601, 603, 605, and 607 and the user contexts matched with the networks 601, 603, 605, and 607 are output, the user may select and use any one of the output networks. For example, when the user wants to use a video application, he or she may use the network 601 of café A. In FIG. 8, it is shown that the electronic device 101 matches each Wi-Fi with the user context to be output on the display 160. However, the electronic device 101 may match an LTE network 609 with the user context to be output on the display 160.

According to an embodiment of the disclosure, the electronic device 101 may match the networks with the user contexts to be output on the display 160, thus providing convenience to the user.

Figure 7:
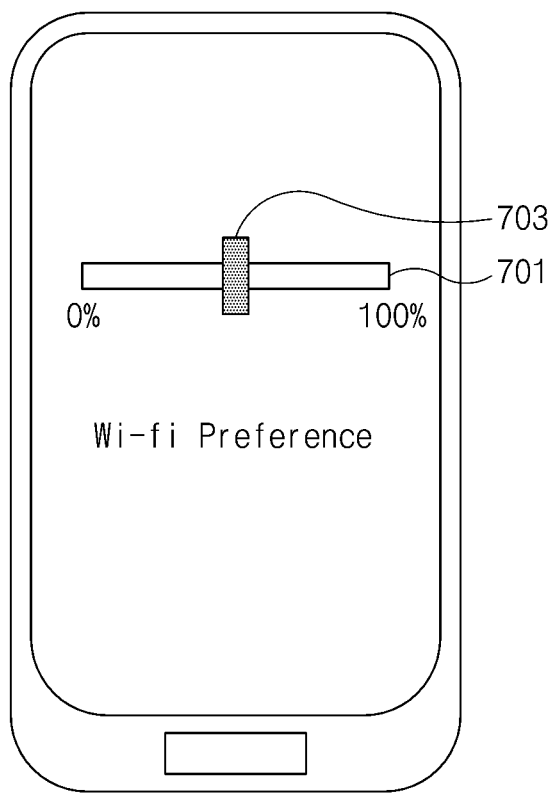
FIG. 7 illustrates a UI for adjusting Wi-Fi preference based on a user input on a display of an electronic device according to an embodiment.

FIG. 7 illustrates a UI for adjusting Wi-Fi preference based on a user input on a display of an electronic device according to an embodiment. Unlike an embodiment described in Table 1, an embodiment shown in FIG. 7 is about an embodiment in which a user directly adjusts Wi-Fi preference (or class).

Referring to FIG. 7, an electronic device 101 may adjust Wi-Fi preference in response to a user input. For example, when the user moves a cursor 703 on a bar 701, the Wi-Fi preference may vary with a location of the cursor 703. As the cursor 703 is closer to 0%, the Wi-Fi preference may become lower. As the cursor 703 is closer to 100%, the Wi-Fi preference may become higher.

As an embodiment, as the cursor 703 is closer to 0%, because the Wi-Fi preference becomes lower, a threshold of a user context may become large. When the threshold becomes large, because there is a high probability that communication quality will be less than the threshold, there may be a high probability that the electronic device 101 will be connected with LTE. Unlike the above-mentioned example, as the cursor 703 is closer to 100%, because the Wi-Fi preference becomes higher, the threshold of the user context may become small. When the threshold becomes small, because there is a high probability that the communication quality will be greater than the threshold, there may be a high probability that the electronic device 101 will be connected with Wi-Fi.

As an embodiment, the electronic device 101 may adjust a class in response to a user input. For example, the user may adjust the class while moving the cursor 703 on the bar 701. Furthermore, the electronic device 101 may adjust the class for each user context. For example, when the user moves a cursor on a bar corresponding to a video context, a class of the video context may be adjusted.

According to an embodiment of the disclosure, the user may directly adjust the Wi-Fi preference such that convenience may be provided to the user.

FIG. 8 illustrates an operational flowchart of an electronic device for changing a network from Wi-Fi to LTE according to an embodiment. In an embodiment to be described below, a threshold of a video context may be −10 dB, and a threshold of a browsing context may be −20 dB.

In operation 801 according to an embodiment, an electronic device 101 may be connected to a Wi-Fi network. For example, the electronic device 101 may be connected with the Wi-Fi network via at least one communication circuitry included in the electronic device 101.

In operation 803 according to an embodiment, the electronic device 101 may determine quality of the connected network. For example, when the electronic device 101 and Wi-Fi are connected with each other, the electronic device 101 may measure a link condition between the electronic device 101 and Wi-Fi. The link condition may vary with strength of a signal transmitted from an access point (AP) to the electronic device 101.

In operation 805 according to an embodiment, the electronic device 101 may compare the link condition with a first threshold. The first threshold may be the largest value among thresholds of user contexts. For example, the first threshold among thresholds shown in FIG. 2 may be a threshold of the video context. When the link condition is greater than or equal to the first threshold as a result of comparing the link condition with the first threshold, the electronic device 101 may maintain the connection state between the electronic device 101 and Wi-Fi. For example, when the link condition is −5 dB, because the link condition is greater than thresholds of all user contexts, the electronic device 101 may maintain the connection state between the electronic device 101 and the Wi-Fi network.

In operation 807 according to an embodiment, the electronic device 101 may determine a user context. For example, when the link condition is less than the first threshold as a result of the comparison between the link condition and the first threshold, the electronic device 101 may determine the user context. For example, when the link condition is −15 dB, the electronic device 101 may determine the user context.

In operation 809 according to an embodiment, the electronic device 101 may compare the link condition with a second threshold. The second threshold may be a threshold of the user context determined in operation 807. When the link condition is greater than or equal to the second threshold, the electronic device 101 may maintain the connection state between the electronic device 101 and the Wi-Fi network. For example, the link condition may be −15 dB, and the determined user context may be the browsing context. When the link condition is −15 dB, it is less than a threshold of the video context and is greater than a threshold of the browsing context. Thus, when the link condition is greater than or equal to a threshold of the determined user context, the electronic device 101 may maintain the connection state between the electronic device 101 and the Wi-Fi network.

In operation 811 according to an embodiment, the electronic device 101 may measure network quality of Wi-Fi. When the link condition is −25 dB, the electronic device 101 may measure the network quality of Wi-Fi. The network quality may vary with strength of a signal transmitted from a network connected with an AP to the AP. The network quality may vary with strength of a signal transmitted and received between a communication circuitry 170 and the network connected with the AP.

In operation 813 according to an embodiment, the electronic device 101 may compare the network quality with a specified level. When the network quality is greater than or equal to the specified level as a result of the comparison, the electronic device 101 may maintain the connection state between the electronic device 101 and the Wi-Fi network. When the user context is the browsing context, although the link condition is −25 dB, when the network quality is greater than or equal to the specified level, the electronic device 101 may maintain a network connected with the electronic device 101 as Wi-Fi. According to an embodiment of the disclosure, although the link condition is slightly low, when the network quality is high, the connection between the electronic device 101 and the Wi-Fi network may be maintained.

In operation 815 according to an embodiment, the electronic device 101 may change the network connected with the electronic device 101 from Wi-Fi to LTE. When the user context is the browsing context, and when the link condition is −25 dB and when the network quality is less than the specified level, the electronic device 101 may change the network connected with the electronic device 101 from Wi-Fi to LTE. According to an embodiment of the disclosure, the electronic device 101 may measure the link condition and the network quality depending on the user context to provide an optimum environment in which the electronic device 101 may operate to a user.

Figure 9:
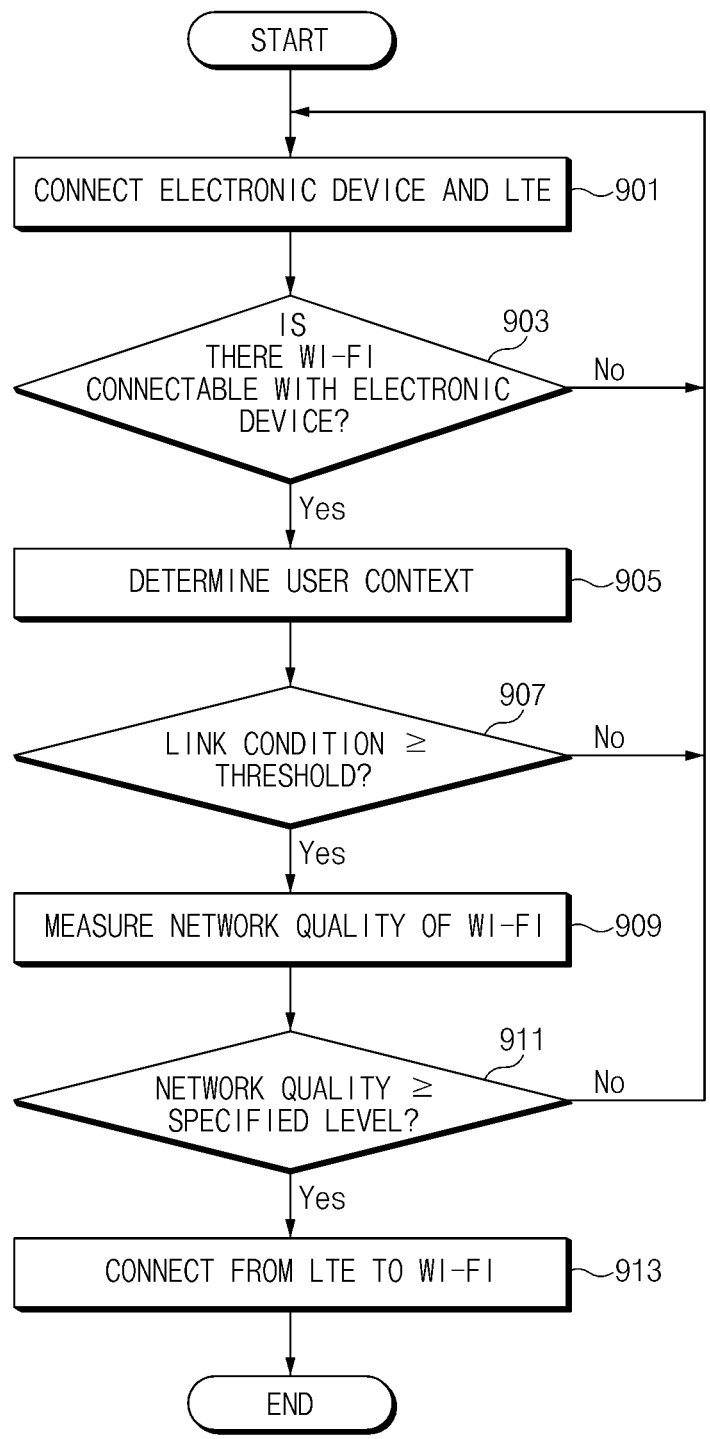
FIG. 9 illustrates an operational flowchart of an electronic device for changing a network from LTE to Wi-Fi according to an embodiment.

FIG. 9 illustrates an operational flowchart of an electronic device for changing a network from LTE to Wi-Fi according to an embodiment. In FIG. 9, a link condition and network quality may correspond to, for example, a link condition and network quality described in FIG. 8. In an embodiment to be described below, a threshold of a video context may be −10 dB.

In operation 901 according to an embodiment, an electronic device 101 and an LTE network may be connected with each other. For example, the electronic device 101 may be connected with the LTE network via at least one communication circuitry included in the electronic device 101.

In operation 903 according to an embodiment, the electronic device 101 may determine whether there is a Wi-Fi network connectable with the electronic device 101. When there is no Wi-Fi network connectable with the electronic device 101 as a result of the comparison, the electronic device 101 may maintain the connection between the electronic device 101 and the LTE network.

In operation 905 according to an embodiment, the electronic device 101 may determine a user context. For example, when there is the Wi-Fi network connectable with the electronic device 101 as a result of the determination in operation 903, in operation 905, the electronic device 101 may determine the user context.

In operation 907 according to an embodiment, the electronic device 101 may determine whether a link condition between the electronic device 101 and the Wi-Fi network is greater than or equal to a threshold. The threshold may be a threshold of the user context determined in operation 905. When the link condition is less than the threshold as a result of the determination, the electronic device 101 may maintain the connection between the electronic device 101 and the LTE network. For example, when the user context is a video context and when the link condition is −15 dB, the electronic device 101 may maintain the connection between the electronic device 101 and the LTE network.

In operation 909 according to an embodiment, the electronic device 101 may measure network quality of Wi-Fi. For example, when the link condition is greater than or equal to the threshold as a result of the determination in operation 907, in operation 909, the electronic device 101 may measure network quality of Wi-Fi.

In operation 911 according to an embodiment, the electronic device 101 may compare the network quality with a specified level. When the network quality is less than the specified level as a result of the comparison, the electronic device 101 may maintain the connection state between the electronic device 101 and the LTE network. For example, when the user context is the video context and when the link condition is −5 dB, although the link condition is greater than the threshold, because the network quality is lower than the specified level, the electronic device 101 may maintain the connection between the electronic device 101 and the LTE network.

In operation 913 according to an embodiment, the electronic device 101 may change a network connected with the electronic device 101 from LTE to Wi-Fi. For example, when the user context is the video context, when the link condition is −5 dB, and when the network quality is greater than or equal to the specified level, the electronic device 101 may change the network from LTE to Wi-Fi. According to an embodiment of the disclosure, when the link condition between the electronic device 101 and the Wi-Fi network and the network quality are good, the network may be changed from LTE to Wi-Fi to reduce an amount of data received via the LTE network.

Figure 10:
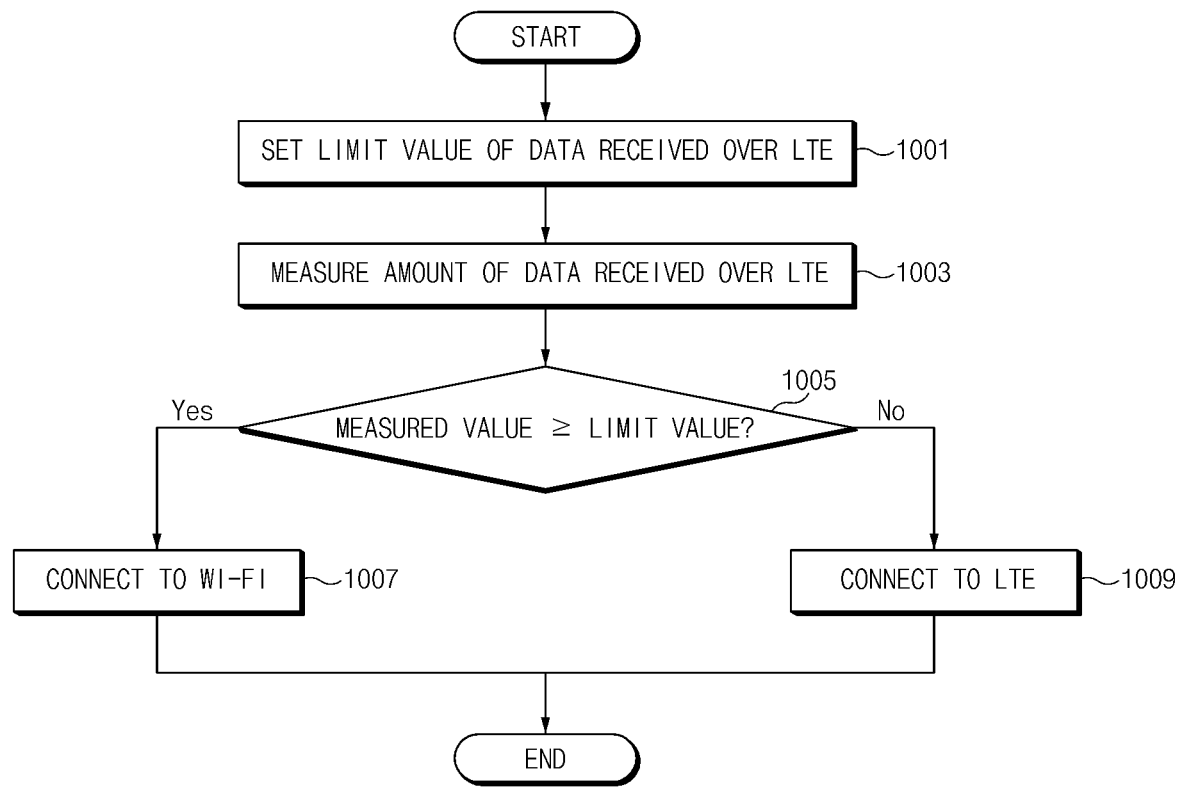
FIG. 10 illustrates an operational flowchart of an electronic device connected with Wi-Fi or LTE based on an amount of data received over LTE according to an embodiment.

FIG. 10 illustrates an operational flowchart of an electronic device 101 connected with Wi-Fi or LTE based on an amount of data received over LTE according to an embodiment.

In operation 1001 according to an embodiment, the electronic device 101 may set a limit value of data received over the LTE network. For example, the electronic device 101 may set the limit value of the data received over the LTE network to 5 GB.

In operation 1003 according to an embodiment, the electronic device 101 may measure an amount of the data received over the LTE network. The amount of the data received over the LTE network may vary with an operation of the electronic device 101, executed while the electronic device 101 is connected to the LTE network. For example, there may be more amounts of data when downloading a video over the LTE network than when receiving a message from another user.

In operation 1005 according to an embodiment, the electronic device 101 may compare the measured value with the limit value. As a result of the comparison, a network connected with the electronic device 101 may vary with whether the measured value is greater than the limit value.

In operation 1007 according to an embodiment, when the measured value is greater than or equal to the limit value, the electronic device 101 may be connected with the Wi-Fi network. In operation 1009 according to an embodiment, when the measured value is less than the limit value, the electronic device 101 may be connected with the LTE network. For example, when the limit value is 5 GB and the measured value is 6 GB, the electronic device 101 may be connected with the Wi-Fi network. When the limit value is 5 GB and when the measured value is 3 GB, the electronic device 101 may be connected with the LTE network.

According to an embodiment of the disclosure, when the measured value reaches a predetermined level of the limit value, the electronic device 101 may be configured to be connected with the LTE network. For example, the electronic device 101 may be configured to, when the limit value is 5 GB, be connected with the LTE network when the measured value is 4 GB which is 80% of the limit value. According to an embodiment of the disclosure, the amount of the data received over the LTE network may be limited to prevent communication costs from being increased.

Figure 11:
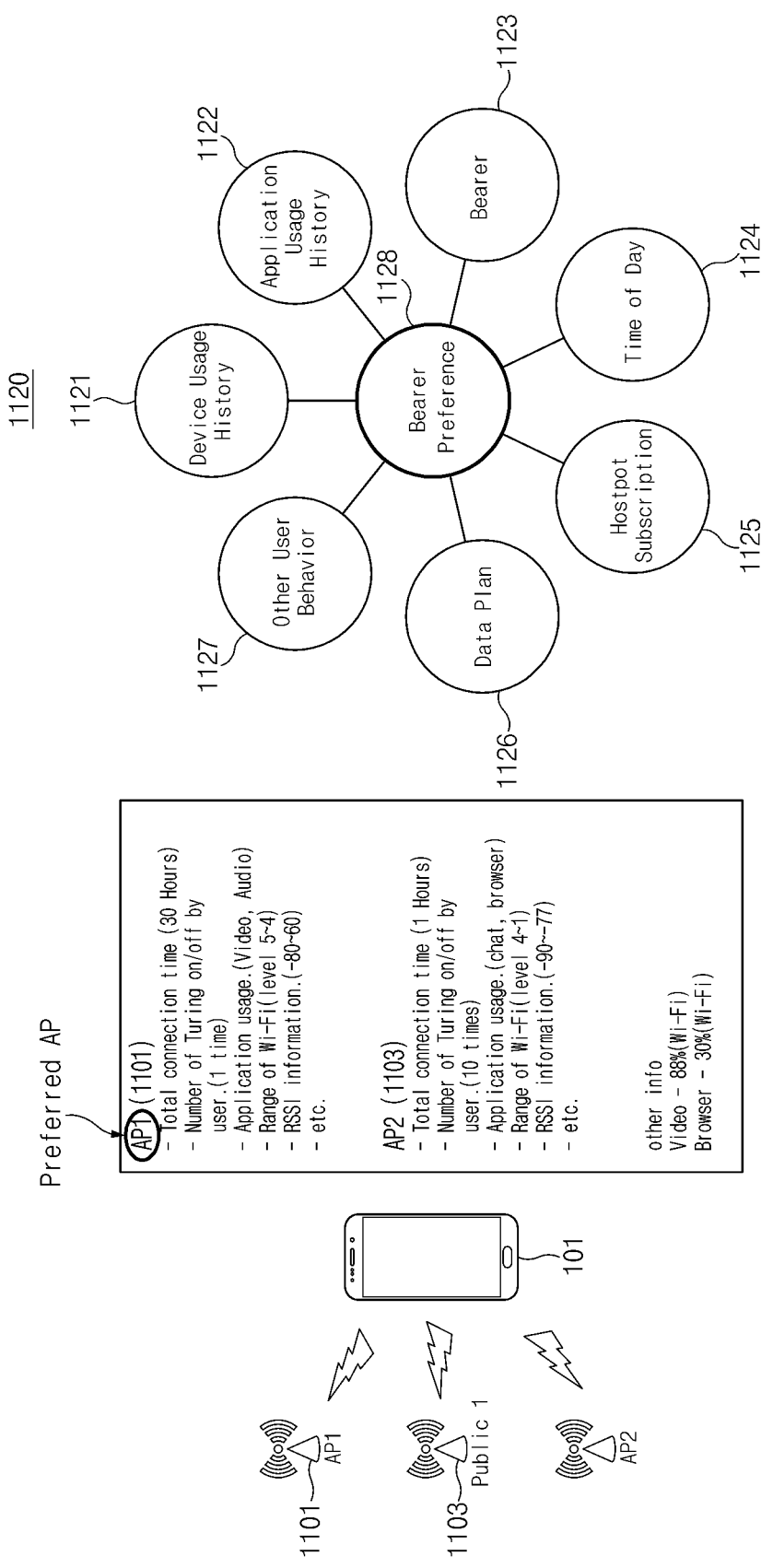
FIG. 11 illustrates an electronic device connected with an AP a user prefers and information stored in the electronic device according to an embodiment.

FIG. 11 illustrates an electronic device connected with an AP a user prefers and information stored in the electronic device according to an embodiment.

Referring to FIG. 11, when an electronic device 101 is connected with a network (e.g., Wi-Fi), it may store information 1120. The information 1120 may store at least one of information associated with a time when the electronic device 101 maintains a connection with the network, the number of times that the connection is released during the time, a type of an application executed during the time, coverage of the network, and/or signal strength of the network. For example, when the electronic device 101 and a Wi-Fi network are connected with each other, a memory 130 may store at least one of a time when a connection between the electronic device 101 and an AP is maintained, the number of times that the connection between the electronic device 101 and the AP is released, a type of an application executed during the time, coverage of Wi-Fi, and signal strength of Wi-Fi. For another example, the information 1120 may include a device usage history 1121 of an electronic device, an application usage history 1122, a bearer 1123, a time of day 1124 of the electronic device, hotspot subscription 1125, a data plan 1126, other user behavior 1127, bearer preference 1128, or the like.

A processor 120 may determine an optimum network to be connected with the electronic device 101 using the information 1120 stored in the memory 130. As an embodiment, as a time when the electronic device 101 is connected with the network is longer and as the number of times that the connection is released during the time is smaller, the processor 120 may determine the network as the optimum network. For example, in FIG. 11, a time when the electronic device 101 and AP1 1101 are connected with each other is 30 hours and a time when the electronic device 101 and AP2 1103 are connected with each other may be 1 hour. For another example, the number of times that the connection is released during the time when the electronic device 101 and the AP1 1101 are connected with each other may be 1 time and the number of times that the connection is released during the time when the electronic device 101 and the AP2 1103 are connected with each other may be 10 times. Thus, the processor 120 may select the AP1 1101 as an optimum AP to be connected with the electronic device 101 between the AP1 1101 and the AP2 1103 and may connect the electronic device 101 and the AP1 1101.

Unlike the above-mentioned example, the processor 120 may determine the optimum network based on coverage of the network and signal strength of the network. For example, as the coverage of the network is wider and as the signal strength of the network is stronger, the processor 120 may determine the network as the optimum network.

An electronic device according to an embodiment of the disclosure may include a communication circuitry, a processor electrically connected with the communication circuitry, and a memory electrically connected with the processor. The memory may store instructions, when executed, causing the processor to connect the electronic device and a first network using the communication circuitry, determine a first user context among user contexts which are data associated with an operation state of the electronic device, and maintain a connection with the first network or switch from the connected first network to a second network different from the connected first network, based on whether communication quality of the first network meets first communication quality corresponding to the determined first user context.

The memory according to an embodiment of the disclosure may store instructions, when executed, causing the processor to determine the first user context based on at least any one of an on/off state of a display and an application executed in the electronic device.

The memory according to an embodiment of the disclosure may store instructions, when executed, causing the processor to connect the communication circuitry with the first network via an access point (AP) and measure a link condition based on strength of a signal transmitted and received between the AP and the communication circuitry.

The memory according to an embodiment of the disclosure may store instructions, when executed, causing the processor to maintain the first network when the link condition is greater than or equal to a threshold corresponding to the first user context and switch to the second network when the link condition is less than the threshold.

The memory according to an embodiment of the disclosure may store instructions, when executed, causing the processor to measure network quality based on strength of a signal transmitted and received between the communication circuitry and a network connected with the AP.

The memory according to an embodiment of the disclosure may store instructions, when executed, causing the processor to maintain the first network when the network quality is greater than or equal to a specified level corresponding to the first user context and switch to the second network when the network quality is less than the specified level.

The memory according to an embodiment of the disclosure may store instructions, when executed, causing the processor to determine whether the first user context is changed to a second user context based on at least any one of an on/off state of a display and an application executed in the electronic device.

The memory according to an embodiment of the disclosure may store instructions, when executed, causing the processor to, when the first user context is changed to the second user context, maintain the first network or switch to the second network based on whether the communication quality of the first network meets second communication quality corresponding to the changed second user context.

The memory according to an embodiment of the disclosure may store instructions, when executed, causing the processor to maintain the first network when the communication quality of the first network meets the second communication quality and switch to the second network when the communication quality of the first network does not meet the second communication quality.

The memory according to an embodiment of the disclosure may store instructions, when executed, causing the processor to set a level of the first user context based on a ratio of data received over the first network by the electronic device.

The memory according to an embodiment of the disclosure may store instructions, when executed, causing the processor to adjust a level of the first user context in response to the user input.

The memory according to an embodiment of the disclosure may store instructions, when executed, causing the processor to determine the first user context based on location information of the electronic device.

The first network according to an embodiment of the disclosure may be Wi-Fi, and the second network may be LTE.

The memory according to an embodiment of the disclosure may be configured to store at least one of a time when the communication circuitry maintains the connection with the first network when the communication circuitry is connected with the first network, the number of times that the connection is released, a type of an application executed during a time when the connection is maintained, coverage of the first network, and signal strength of the first network.

The memory according to an embodiment of the disclosure may store instructions, when executed, causing the processor to determine the first user context based on strength of a signal received from the first network.

An electronic device according to an embodiment of the disclosure may include a communication circuitry, a processor electrically connected with the communication circuitry, and a memory electrically connected with the processor. The memory may store instructions, when executed, causing the processor to connect the electronic device and a first network using the communication circuitry, determine whether there is a second network connectable with the electronic device, determine a first user context among user contexts which are data associated with an operation state of the electronic device when there is the second network connectable with the electronic device as a result of the determination, and maintain the first network or switch to the second network, based on whether communication quality of the second network meets first communication quality corresponding to the determined first user context.

The memory according to an embodiment of the disclosure may store instructions, when executed, causing the processor to switch to the second network when the communication quality of the second network meets the first communication quality and maintain the first network when the communication quality of the second network does not meet the first communication quality.

The memory according to an embodiment of the disclosure may store instructions, when executed, causing the processor to connect the communication circuitry with the second network via an access point (AP) and measure a link condition based on strength of a signal transmitted and received between the AP and the communication circuitry.

The memory according to an embodiment of the disclosure may store instructions, when executed, causing the processor to switch to the second network when the link condition is greater than or equal to a threshold corresponding to the first user context and maintain the first network when the link condition is less than the threshold.

The memory according to an embodiment of the disclosure may store instructions, when executed, causing the processor to switch to the second network when an amount of data received over the first network by the communication circuitry is greater than or equal to a limit value and maintain the first network when the amount of the data received over the first network is less than the limit value.

Figure 12:
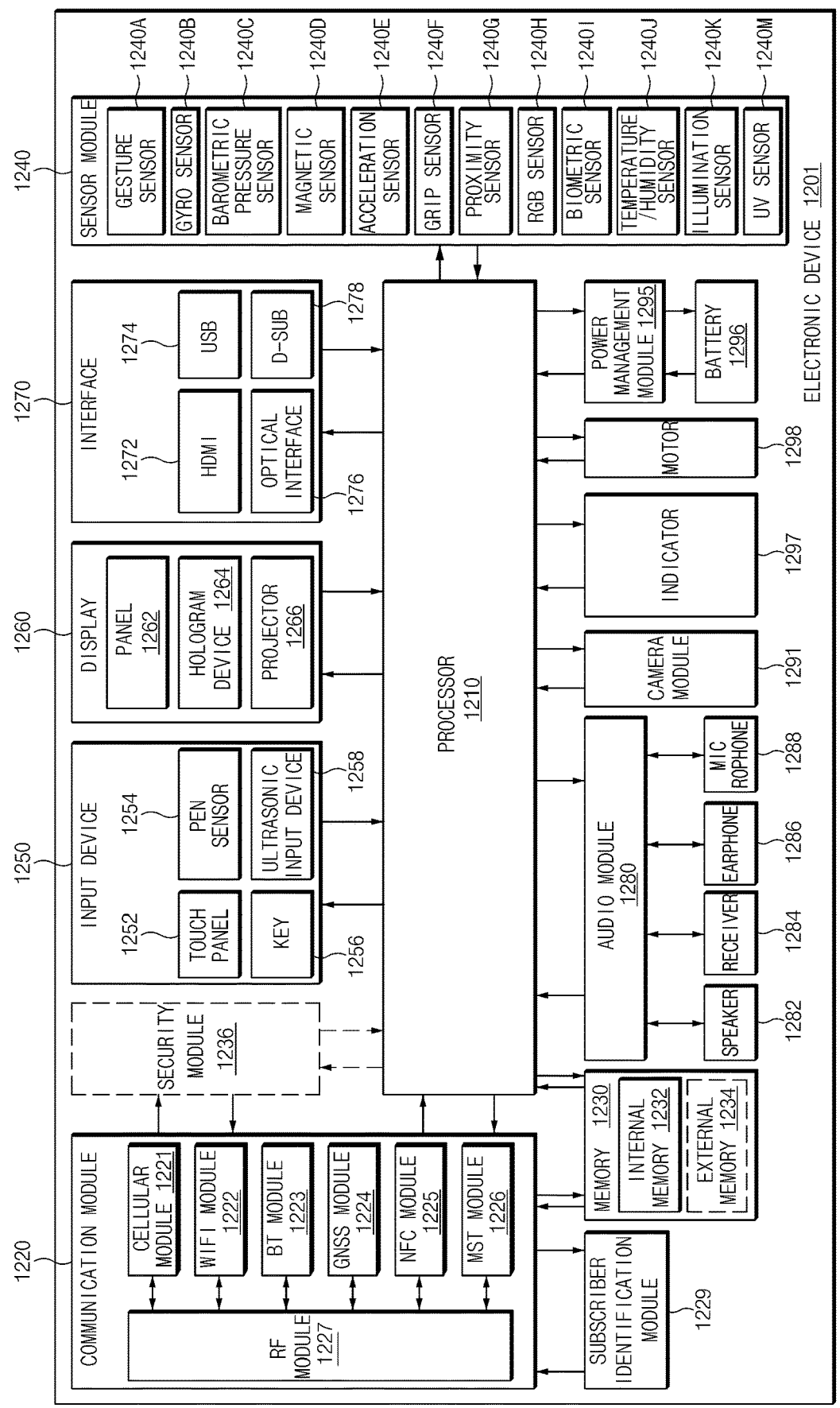
FIG. 12 illustrates a block diagram of an electronic device according to an embodiment.

FIG. 12 illustrates a block diagram of an electronic device, according to various embodiments.

Referring to FIG. 12, an electronic device 1201 may include, for example, all or a part of the electronic device 101 illustrated in FIG. 1. The electronic device 1201 may include one or more processors (e.g., an application processor (AP)) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software components connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of components illustrated in FIG. 12. The processor 1210 may load a command or data, which is received from at least one of other components (e.g., a nonvolatile memory), into a volatile memory and process the loaded command or data. The processor 1210 may store a variety of data in the nonvolatile memory.

The communication module 1220 may be configured the same as or similar to the communication interface 170 of FIG. 1. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1230 (e.g., the memory 130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or alternatively, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, or the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 160) may include a panel 1262, a hologram device 1264, or a projector 1266. The panel 1262 may be the same as or similar to the display 160 illustrated in FIG. 1. The panel 1262 may be implemented, for example, to be flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 170 illustrated in FIG. 1. Additionally or alternatively, the interface 1270 may include, for example, a mobile high definition link (MHL) interface, a SD card/multimedia card (MMC) interface, or an infrared data association (IrDA) standard interface.

The audio module 1280 may convert a sound and an electric signal in dual directions. At least a component of the audio module 1280 may be included, for example, in the input/output interface 150 illustrated in FIG. 1. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 13:
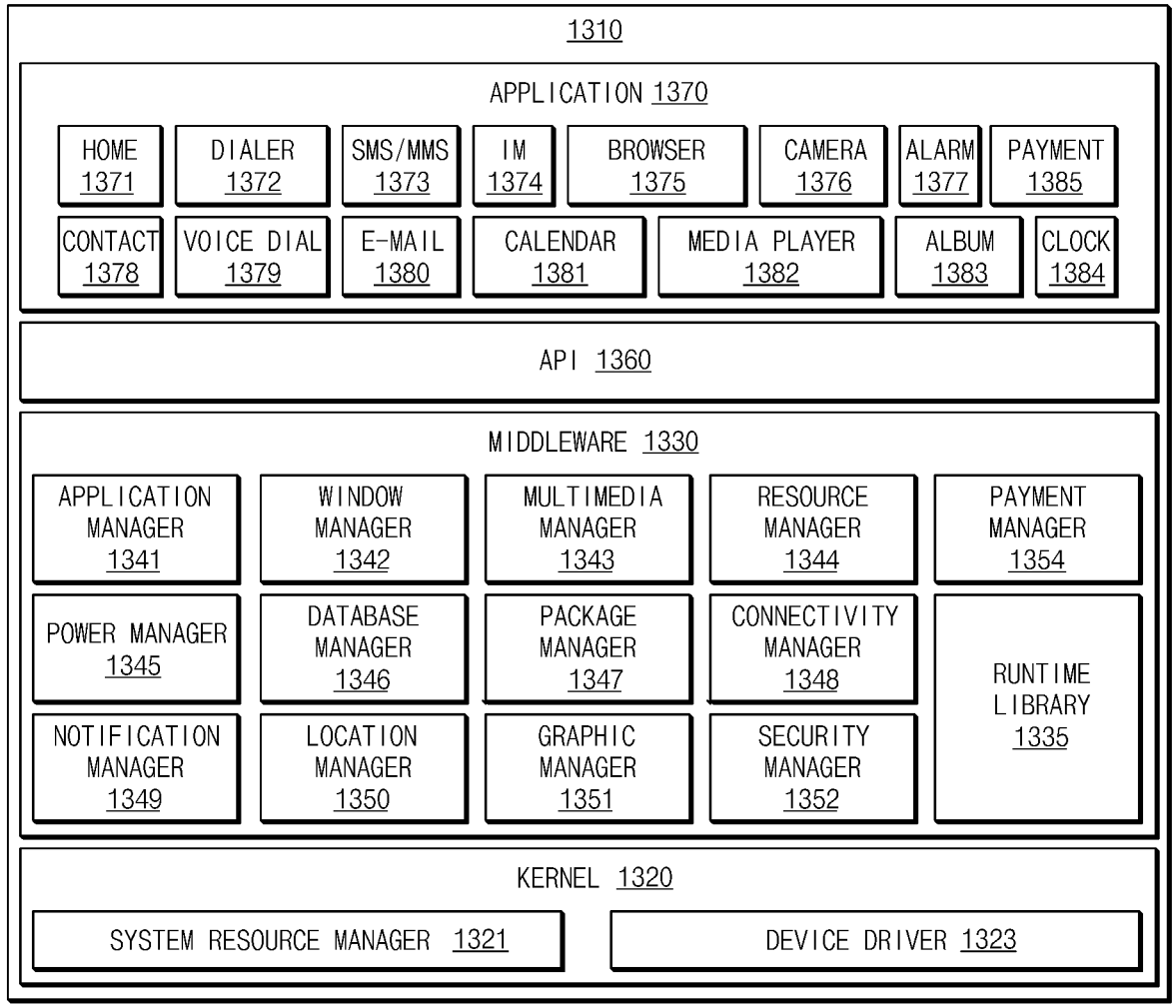
FIG. 13 illustrates a block diagram of a program module according to an embodiment.

FIG. 13 illustrates a block diagram of a program module, according to various embodiments.

According to an embodiment, a program module 1310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, or Tizen™.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., the first electronic device 102, the second electronic device 104, the server 106, or the like).

The kernel 1320 (e.g., the kernel 141) may include, for example, a system resource manager 1321 or a device driver 1323. The system resource manager 1321 may perform control, allocation, or retrieval of system resources. According to an embodiment, the system resource manager 1321 may include a process managing unit, a memory managing unit, or a file system managing unit. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, in the case where an electronic device (e.g., the electronic device 101) includes a telephony function, the middleware 1330 may further include a telephony manager for managing a voice or video call function of the electronic device.

The middleware 1330 may include a middleware module that combines diverse functions of the above-described components. The middleware 1330 may provide a module specialized to each OS kind to provide differentiated functions. Additionally, the middleware 1330 may dynamically remove a part of the preexisting components or may add new components thereto.

The API 1360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1370 (e.g., the application program 147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, or a timepiece 1384, or for offering health care (e.g., measuring an exercise quantity, blood sugar, or the like) or environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device. According to an embodiment, the application 1370 may include an application that is received from an external electronic device (e.g., the first electronic device 102, the second electronic device 104, or the server 106). According to an embodiment, the application 1370 may include a preloaded application or a third party application that is downloadable from a server. The names of components of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 130), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   communication circuitry;
   a processor electrically connected with the communication circuitry; and
   a memory electrically connected with the processor,
   wherein the memory stores instructions, when executed, causing the processor to:
      connect the electronic device and a first network using the communication circuitry;
      determine a first user context among user contexts which are data associated with an operation state of the electronic device;
      set a level of the first user context based on a ratio of data received over the first network to a sum of data received over the first network and a second network, by the electronic device;
      identify first communication quality corresponding to the determined first user context based on the level of the first user context; and
      maintain a connection with the first network or switch from the first network to the second network based on whether communication quality of the first network meets the first communication quality,
      wherein the first network and the second network are based on different communication protocols.

2. The electronic device of claim 1, wherein the memory stores instructions, when executed, causing the processor to:
   determine the first user context based on at least any one of an on/off state of a display and an application executed in the electronic device.

3. The electronic device of claim 1, wherein the memory stores instructions, when executed, causing the processor to:
   connect the communication circuitry with the first network via an access point (AP); and
   measure a link condition based on strength of a signal transmitted and received between the AP and the communication circuitry,
   wherein the link condition is included in the communication quality of the first network.

4. The electronic device of claim 3, wherein the memory stores instructions, when executed, causing the processor to:
   maintain the connection to the first network, when the link condition is greater than or equal to a threshold corresponding to the first user context; and
   switch to the second network, when the link condition is less than the threshold corresponding to the first user context.

5. The electronic device of claim 3, wherein the memory stores instructions, when executed, causing the processor to:
   measure network quality based on strength of a signal transmitted and received between the communication circuitry and the first network connected with the AP,
   wherein the network quality is included in the communication quality of the first network.

6. The electronic device of claim 5, wherein the memory stores instructions, when executed, causing the processor to:
   maintain the connection to the first network, when the network quality is greater than or equal to a specified level corresponding to the first user context; and
   switch to the second network, when the network quality is less than the specified level.

7. The electronic device of claim 1, wherein the memory stores instructions, when executed, causing the processor to:
   determine whether the first user context is changed to a second user context based on at least any one of an on/off state of a display and an application executed in the electronic device.

8. The electronic device of claim 7, wherein the memory stores instructions, when executed, causing the processor to:
   when the first user context is changed to the second user context, maintain the connection to the first network or switch to the second network based on whether the communication quality of the first network meets second communication quality corresponding to the changed second user context.

9. The electronic device of claim 8, wherein the memory stores instructions, when executed, causing the processor to:
   maintain the connection to the first network, when the communication quality of the first network meets the second communication quality; and
   switch to the second network, when the communication quality of the first network does not meet the second communication quality.

10. The electronic device of claim 1, further comprising a display,
    wherein the memory stores instructions, when executed, causing the processor to:
       adjust the level of the first user context in response to a user input received through the display.

11. The electronic device of claim 1, wherein the memory stores instructions, when executed, causing the processor to:
    determine the first user context based on location information of the electronic device with the operation state of the electronic device.

12. The electronic device of claim 1, wherein the first network is Wi-Fi and the second network is LTE (Long-Term Evolution).

13. The electronic device of claim 1, wherein the memory is configured to store at least one of:

a time when the communication circuitry maintains the connection with the first network when the communication circuitry is connected with the first network;
a number of times that the connection is released;
a type of an application executed during a time when the connection is maintained;
coverage of the first network; and
signal strength of the first network.

14. The electronic device of claim 1, wherein the memory stores instructions, when executed, causing the processor to:
determine the first user context based on strength of a signal received from the first network with the operation state of the electronic device.

* * * * *